United States Patent [19]

Chang

[11] 4,371,657
[45] Feb. 1, 1983

[54] CRATER RESISTANT ACRYLIC ENAMEL

[75] Inventor: David C. Chang, Birmingham, Mich.

[73] Assignee: E. I. Du Pont de Nemours and Company, Wilmington, Del.

[21] Appl. No.: 240,573

[22] Filed: Mar. 4, 1981

[51] Int. Cl.³ .............................................. C08L 61/26
[52] U.S. Cl. .................................. 524/512; 524/359; 524/364; 525/160; 428/457
[58] Field of Search ............................ 525/160, 16; 260/29.40 A, 29.6 F, 31.2 R, 31.2 N, 31.4 R, 32.8 R, 32.8 N, 33.4 F; 524/512, 354, 364

[56] References Cited

U.S. PATENT DOCUMENTS

| | | | |
|---|---|---|---|
| 2,681,897 | 6/1954 | Frazier et al. | 525/160 |
| 3,267,174 | 8/1966 | Fry et al. | 525/143 |
| 3,356,628 | 12/1967 | Smith et al. | 260/29.6 F |
| 3,529,995 | 9/1970 | Smith et al. | 525/160 |
| 3,767,728 | 10/1973 | Langsam et al. | 525/160 |
| 3,792,128 | 2/1974 | Uttner et al. | 260/890 |
| 3,822,228 | 7/1974 | Petrella et al. | 260/29.6 F |
| 3,844,999 | 10/1974 | Petrella et al. | 260/29.6 F |
| 4,170,582 | 10/1979 | Mori et al. | 260/29.4 UA |
| 4,208,465 | 6/1980 | Chang | 260/33.6 UA |
| 4,273,695 | 6/1981 | Greene et al. | 524/512 |
| 4,276,212 | 6/1981 | Khanna et al. | 524/512 |

OTHER PUBLICATIONS

Chem. Abs. 29979z vol. 66 (1967) Dupont Neth (6608665).

Primary Examiner—John C. Bleutge
Assistant Examiner—Herbert J. Lilling

[57] ABSTRACT

A crater resistant enamel coating composition used for the exterior of trucks and automobiles in which the binder is a blend of (A) an acrylic polymer having hydroxy groups and contains about 0.1–10% by weight of a polymerized perfluoro carbon constituent of the formula

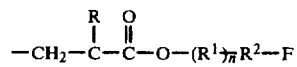

where R is H or $CH_3$, $R^1$ is alkyl, $R^2$ is perfluoro alkyl and n is 0 or 1 and (B) an aminoplast crosslinking agent such as an alkylated melamine formaldehyde resin.

After the composition is applied and baked by conventional techniques, a finish is formed that has an excellent appearance.

11 Claims, No Drawings

CRATER RESISTANT ACRYLIC ENAMEL

BACKGROUND OF THE INVENTION

1. Field Of The Invention

This invention is related to a crosslinkable enamel coating composition with improved appearance properties.

2. Description Of The Prior Art

Crosslinkable enamel coating compositions for automobiles and trucks are well known in the art as shown by Parker U.S. Pat. No. 3,637,546 issued Jan. 25, 1972. Finishes resulting from the aforementioned composition have a good appearance and have been widely used on automobiles and trucks.

To comply with more stringent air pollution regulations, high solids enamel coating compositions were formulated that contained substantially less solvent and more film forming binder. However, finished resulting from these compositions have a significant number of craters which give the finish an unacceptable appearance for use on automobiles and trucks. The novel composition of this invention can be formulated as a high solids enamel that forms finishes with a substantial reduction in the number of craters and has an acceptable appearance.

SUMMARY OF THE INVENTION

A crater resistant coating composition containing about 25-80% by weight of a binder and 20-75% by weight of a liquid, wherein the binder is a blend of the following:

(A) about 40-90% by weight, based on the weight of the binder, of an acrylic polymer having a carboxyl content of up to about 5% by weight, a hydroxyl content of about 0.5 to 10% by weight and contains about 0.1-10% by weight of polymerized perfluorocarbon constituent of the formula

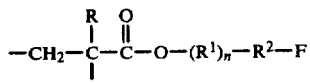

where
R is H or $CH_3$,
$R^1$ is an alkyl group containing 2-8 carbon atoms, n is 0 or 1 and
$R^2$ is a perfluoroalkyl group containing 4-20 carbon atoms, and the polymer has a weight average molecular weight of about 2,000-50,000 determined by gel permeation chromatography; and (B) about 10-60% by weight of an aminoplast crosslinking agent.

DETAILED DESCRIPTION OF THE INVENTION

The coating composition has a binder weight solids content of about 25-80% with the remainder of the composition being a carrier liquid. The liquid carrier can be an organic solvent for the binder, a mixture of organic solvent and non-solvent for the binder which forms a non-aqueous dispersion or a mixture of a water miscible organic solvent and water which forms an aqueous dispersion.

It is preferred to have a high solids coating composition in which the binder weight solids content is at least 50%. For most high solids compositions, the binder weight solids is about 55-75% and an organic solvent is about 25-45% by weight.

The composition can be a clear, i.e., non-pigmented or slightly pigmented with transparent pigments or pigment in a pigment to binder weight ratio of about 0.5 to 100 to about 300 to 100.

The binder of film-forming constituents used in the coating composition comprise about 40-90% by weight of acrylic polymer, and about 10-60% by weight of an aminoplast crosslinking agent.

The acrylic polymer used in the composition has a carboxyl content of up to 5% by weight, a hydroxyl content of about 0.5-10% by weight and a weight average molecular weight determined by gel permeation chromatography using polymethyl methacrylate as a standard of about 2,000-50,000. For high solids composition, acrylic polymers having a weight average molecular weight of about 3000-15,000 are used.

The acrylic polymers utilized herein can be prepared by conventional solution polymerization or by aqueous emulsion polymerization. Acrylic polymer solutions can be formulated into nonaqueous dispersions by the addition of non-solvents to the polymer solution. Aqueous dispersions can be formulated from acrylic polymer solutions wherein the acrylic polymer contains water solubilizing or dispersing groups, such as carboxyl groups, by the addition of an aqueous solution containing a neutralizing agent, such as an amine. Aqueous emulsions can be formulated into coating compositions by the addition of well known constituents.

Generally, the acrylic polymers utilized in the coating composition are prepared by solution polymerization in which the monomers are blended with solvent, polymerization catalyst and optionally, a chain transfer agent, and heated to about 75°-150° C. for 1-12 hours to form a polymer having the aforementioned molecular weight and carboxyl content.

One solution polymerization technique that is successfully used in preparing the acrylic polymer is a programmed addition of monomers, solvent, catalyst solution and optionally, a chain transfer agent into a polymerization vessel at a given rate. These programmed additions can be manually calculated or calculated by a computer. Optionally, the polymers can be terminated with the chain transfer agent at the desired low molecular weight. Also, if required, after the polymerization is completed, solvents can be stripped off to increase the polymer solids content of the resulting polymer solution.

Typical solvents which are used to prepare the acrylic polymer are the following: toluene, ethyl acetate, acetone, methyl isobutyl ketone, methylethyl ketone, methyl amyl ketone, ethyl alcohol, mineral spirits, ethylene glycol monoethyl ether acetate, and other conventional aliphatic, cycloaliphatic and aromatic hydrocarbon, esters, ethers, ketones and alcohols.

About 0.1-6% by weight, based on the weight of the monomers, of the polymerization catalyst is used to prepared the acrylic polymer. Typical catalysts are: azo-bis-isobutyronitrile, azo-bis(gamma dimethyl valeronitrile), benzoyl peroxide, t-butyl pivalate, t-butyl per acetate and the like.

A chain transfer agent can be used to control the molecular weight of the acrylic polymer. Typical chain transfer agents are 2-mercapto ethanol, dodecyl mercaptan, benzene thioethanol, mercapto succinic acid, butyl mercaptan, lauryl mercaptan, mercapto propionic acid and the like. When a transfer agent is used, the resulting acrylic polymer contains about 0.1-10% by weight of a chain transfer agent.

The acrylic polymers used in the coating composition are of polymerized alkyl methacrylate monomers that have 1-18 carbon atoms in the alkyl group, alkyl acrylate monomers that have 2-18 carbon atoms in the alkyl group and hydroxy alkyl acrylate or a hydroxy alkyl methacrylate monomer each preferably having 2-4 carbon atoms in the alkyl group, perfluorocarbon monomers and optionally, α-β unsaturated carboxylic acid monomers. Sufficient amount of hydroxyl containing monomers are used to provide the polymer with a hydroxyl content of 0.5 to 10% by weight. Optionally, carboxylic acid monomers are used to provide a carboxyl content of up to 5% by weight. The perfluorocarbon monomers are used in an amount of 0.1-10% by weight, based on the weight based on the weight of the polymer.

Typical alkyl methacrylates and acrylates that can be used to prepare the acrylic polymer are: methyl methacrylate, ethyl methacrylate, butyl methacrylate, hexyl methacrylate, 2-ethylhexyl methacrylate, nonyl methacrylate, lauryl methacrylate, stearyl methacrylate, cyclohexyl methacrylate, isodecyl methacrylate, propyl methacrylate, decyl methacrylate, isobornyl methacrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, decyl acrylate, isobornyl acrylate and the like.

Adhesion promoting monomers can also be used in the acrylic polymer such as diethyl aminoethyl methacrylate, tertiary butyl aminoethyl methacrylate, 3-(2-methacryloxy ethyl)-2,2-spiro cyclohexyl oxazolidene and the like.

Typical hydroxyl alkyl acrylates and methacrylates which can be used to prepare the acrylic polymer are: 2-hydroxy ethyl acrylate, 2-hydroxy propyl acrylate, 2-hydroxy butyl acrylate, 2-hydroxy ethyl methacrylate, 2-hydroxy propyl methacrylate, 2-hydroxy butyl methacrylate, and the like.

Typical α-β ethylenically unsaturated carboxylic acid monomers are acrylic acid, methacrylate acid, itaconic acid and the like.

The perfluorocarbon monomer used in the acrylic polymer in conjunction with the other constituents of the polymer provides a coating composition which give finishes that have substantially less craters in comparison to similar composition that do not contain the perfluorocarbon monomer. The perfluorocarbon monomer has the following formula:

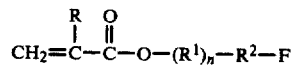

where
R is H or CH$_3$,
R$^1$ is an alkyl group containing 2-8 carbon atoms, n is 0 or 1 and
R$^2$ is a perfluoroalkyl group containing 4-20 carbon atoms.

Typically useful perfluoro carbon monomers are as follows: perfluoro butyl methacrylate, perfluoro pentyl methacrylate, perfluoro hexyl methacrylate, perfluoro octyl methacrylate, perfluoro decyl methacrylate, perfluoro lauryl methacrylate, perfluoro stearyl methacrylate, perfluoro butyl acrylate, perfluoro pentyl acrylate, perfluoro hexyl acrylate, perfluoro octyl acrylate, perfluoro decyl acrylate, perfluoro lauryl methacrylate, perfluoro stearyl acrylate, perfluoro butyl ethyl methacrylate, perfluoro pentyl ethyl methacrylate, perfluoro hexyl ethyl methacrylate, perfluoro octyl ethyl methacrylate, perfluoro nonyl ethyl methacrylate, perfluoro decyl ethyl methacrylate, perfluoro lauryl ethyl methacrylate, perfluoro stearyl ethyl methacrylate, perfluoro butyl ethyl acrylate, perfluoro pentyl ethyl acrylate, perfluoro hexyl ethyl acrylate, perfluoro octyl ethyl acrylate, perfluoro nonyl ethyl acrylate, perfluoro lauryl ethyl acrylate, perfluoro lauryl ethyl acrylate, perfluoro stearyl ethyl acrylate, perfluoro butyl propyl methacrylate, perfluoro pentyl butyl methacrylate, perfluoro hexyl pentyl methacrylate, perfluoro hexyl octyl methacrylate, perfluoro lauryl propyl acrylate, perfluoro stearyl butyl acrylate and the like.

One preferred perfluorocarbon monomer is a perfluoro alkyl ethyl methacrylate having 6-12 carbon atoms in the alkyl group.

The acrylic polymer can contain about 0.1-30% by weight of other constituents such as glycidyl acrylate, glycidyl methacrylate, acrylonitrile, methacrylonitrile, acrylamide and methacrylamide, styrene or substituted styrene such as methyl styrene.

Useful acrylic polymers contain about 10-40% by weight of an alkyl methacrylate that has 1-4 carbon atoms in the alkyl group, preferably methyl methacrylate, 30-50% by weight of an alkyl acrylate that has 2-12 carbon atoms in the alkyl group and 15-45% by weight of a hydroxyl alkyl acrylate or a hydroxyl alkyl methacrylate each having 2-4 carbon atoms in the alkyl group, up to 5% by weight of an α-β ethylenically unsaturated carboxylic acid and about 0.1-10% by weight of a perfluoro alkyl ethyl methacrylate. These polymers can contain up to 50% by weight of styrene which replaces a portion of the alkyl methacrylate.

Particularly useful acrylic polymers contain about 10-20% by weight styrene, 10-20% by weight methyl methacrylate, 35-45% by weight butyl acrylate, 25-35% by weight hydroxyl ethyl acrylate, 0.5-5% by weight, of a perfluoro alkyl ethyl methacrylate and 0.1-2% by weight of acrylic acid and have a weight average molecular weight of about 3,000-15,000. Preferred acrylic polymers of the above type contains about 15% styrene, 15% methyl methacrylate, 40% butyl acrylate, 30% hydroxy ethyl acrylate and 0.1-0.5% acrylic acid and 0.5-1.0% of a perfluoro alkyl ethyl methacrylate having 6-12 carbon atoms in the alkyl group.

Optionally, in addition to the above film-forming constituents, about 1-10% by weight, based on the weight of the film-forming constituents of the composition, of cellulose acetate butyrate can be used in the composition. Cellulose acetate butyrate that has a butyryl content of about 25-60% by weight and a viscosity of about 0.01-2 seconds measured according to ASTM-D-1343-56 at 25° C. can be utilized.

Also, plasticizers in the amounts of 0.1-10% by weight, based on the weight of the film-forming constituents, can be used in the composition in addition to the above film forming constituents. Plasticizers that can be used are, for example, butyl benzyl phthalate, dibutyl phthalate, triphenyl phosphate, 2-ethylhexyl benzyl phthalate, dicyclohexyl phthalate, diallyl phthalate, dibenzyl phthalate, butylcyclohexyl phthalate, mixed benzoic acid and fatty oil acid esters of pentaerythritrol, poly-(propylene adipate)dibenzoate, diethylene glycol dibenzoate, tetrabutylthiodisuccinate, butylphthalylbutyl glycolate, acetyltributyl citrate, dibenzylsebacate, tricresyl phosphate, toluene ethyl sulfonamide, and dimethylene cyclohexyl phthalate.

The composition can contain in addition from about 0.5–15% by weight, based on the weight of the film forming constituents, of a polyhydroxy functional compound. This compound is a solvent for the film-forming constituents and reduces the application viscosity of the composition and will react on baking of the finish and will be cross-linked into a resulting finish prepared from the composition. Typical polyhydroxy functional compounds that are useful are trimethylol ethane, trimethylol propane, trimethylol butane, trimethyl pentanediol, pentaerythritol, pentanediol, diethylene glycol, dipropylene glycol, triethylene glycol, 2-ethyl-1,3-hexane diol, tripropylene glycol, butanediol and the like. Low molecular weight hydroxyl terminated polyesters can be used such as a polyester of trimethyl pentanediol and isophthalic acid, a polyester of trimethyl pentanediol and a mixture of dimethyl aliphatic carboxylates.

The aminoplast crosslinking agent used in the composition can be any of the conventional types such as melamine formaldehyde, alkylated melamine formaldehyde, urea formaldehyde, benzoguanamine formaldehyde and the like. Preferred are alkylated melamine formaldehyde resins that have 1–4 carbon atoms in the alkyl group. The resin is prepared by conventional techniques in which an alcohol such as methanol, ethanol, propanol, isopropanol, butanol, isobutanol, tertiary butanol and the like is reacted with a melamine formaldehyde resin. The resin can be monomeric or polymeric. Preferred resins which gives a high quality finish are hexamethoxymethyl melamine and a methylated/butylated melamine formaldehyde resin.

As mentioned before, the composition can contain pigments. These pigments can be introduced into the composition by first forming a mill base with the acrylic polymer utilized in the composition or with other compatible polymers or polymeric dispersants by conventional techniques, such as sand-grinding, ball milling, attritor grinding, two roll milling to disperse the pigments. The mill base is blended with the film-forming constituents as shown in the following Examples.

Any of the conventional pigments used in the coating compositions can be utilized in this composition such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons and other organic dyes.

To control application rheology of the composition, up to 10% by weight, based on the weight of the composition, of silica or a silica additive as disclosed in Antonelli et al. U.S. Pat. No. 4,238,387 issued Dec. 9, 1980 can be added.

In coating compositions that use aluminum flake, the aluminum flake is blended with a medium molecular weight acrylic polymer and the resulting mill base is blended into the coating composition. In the coating composition the medium molecular weight acrylic polymer provides needed rheology control to allow the aluminum flake to orient properly on baking of the finish to provide an acceptable two tone metallic glamour of the resulting finish.

An acid catalyst solution can be added to the composition to increase the rate of cross-linking of the composition on curing. Generally, about 0.1–2% by weight, based on the weight of the film-forming constituents, of acid catalyst is used. For example, phosphoric acid or an alkyl acid phosphate in which the alkyl groups has 1–12 carbon atoms can be utilized for this purpose. Typical alkyl acid phosphates are methyl acid phosphate, ethyl acid phosphate, propyl acid phosphate, lauryl acid phosphate, and the like. Sulfonic acid or a substituted sulfonic acid can be used such as para-toluene sulfonic acid.

Adducts of the aforementioned acids also can be used as catalysts. For example, epoxy resins reacted with phosphoric acid or an alkyl acid phosphate or with a substituted sulfonic acid such as paratoluene sulfonic acid are useful. Typical epoxy resins that can be used to form these adducts are "Epon" 828, 1002, 1003, 1004 which are the condensation products of epichlorohydrin and bisphenol A. Other compounds can be used to form adducts of these acids such as oxime tosylate or alkyl oxazolidine, e.g., dimethyl oxazolidine.

To improve weatherability of clear and pigmented finishes of the coating composition, about 0.1–5%, by weight, based on the weight of the binder, of an ultraviolet light stabilizer or a combination of ultraviolet light stabilizers can be added. Also, about 0.1–5% by weight, based on the weight of the binder, of an antioxidant can be added. Weatherability of finishes of coating compositions containing aluminum flake are particularly enhanced by the addition of ultraviolet light stabiliers and antioxidants. Typically useful ultraviolet light stabilizers and antioxidants are disclosed hereinafter.

The coating composition of this invention can be applied over a variety of substrates, such as metal, wood, glass, plastics, and the like, by any of the conventional application methods, such as spraying, electrostatic spraying, dipping, brushing, flow-coating and the like. The viscosity of the composition can be adjusted for any of these methods by adding solvents if necessary. Generally, the composition is utilized at a high solids content which keeps air pollution at a minimum level.

The coatings are baked at relatively low temperatures of about 65°–140° C. for about 15 minutes to 2 hours. The resulting coating is about 0.1–5 mils thick but for most uses, a 1–3 mil thick coating is used. One technique that is used to decrease popping or cratering of the coating is to allow the solvents to flash off for about 15–30 seconds before a second coating is sprayed on or otherwise applied, then waiting from about 2–10 minutes before baking the coating to allow any residual solvents to flash off. The resulting coating has good gloss and can be rubbed or polished with conventional techniques to improve the smoothness, appearance and gloss. The coating has good adhesion to substrates of all types, is hard and resistant to weathering, solvents, alkali, scratches and the like. These characteristics make the composition particularly useful as a finish for automobiles, trucks, airplanes, railroad equipment and for the repair of trucks and automobiles. The composition can also be used on appliances, vending machines, outdoor equipment such as bridges, water tanks, gas tanks and the like.

The composition is that it can be used to repair powder coating finishes, in particular, powder coating finishes which are pigmented with metallic flake pigments, such as aluminum flake pigments. Excellent matches between the finish of the powder coating and the finish of the novel composition are achieved.

Another apect of this invention is to utilize the composition as a clear coat/color coat finish for substrates. In this finish, a clear coat top layer is in firm adherence to a color coat layer that is in adherence with a substrate. The clear coat is a transparent film of the coating composition of this invention and the color coat is the coating composition of this invention containing pigments in a pigment to binder ratio of about 1/100 to 150/100 and other additives.

Optionally, the color coat can contain about 0.1–5% by weight, based on the weight of the binder of the color coat, of an ultraviolet light stabilizer. Another option is that the color coat and the clear coat each can contain about 0.1–5% weight, based on the weight of the binder of the coat, of an ultraviolet light stabilizer. Also, the clear coat or the color coat can contain about 0.1–5% by weight, based on the weight of the binder of the coat, of an antioxidant. When an antioxidant is used, the ratio of ultraviolet light stabilizer to antioxidant is about 1:1 to about 50:1.

The thickness of the fully cured color coat and clear coat can vary. Generally, the color coat is about 0.4–1.5 mils thick and preferably 0.6–1.0 mils thick and the clear coat is about 0.5–6.0 mils thick and preferably 0.8–1.5 mils thick. Any of the aforementioned conventional pigments can be used in the color coat including metallic flake pigments can be used. The clear coat can also contain transparent pigments, i.e., pigments having the same or similar refractive index as the binder of the clear coat and are of a small particle size of about 0.015–50 microns. Typical pigments that can be used in a pigment to binder weight ratio of about 1/100 to 10/100 are inorganic siliceous pigments, such as silica pigments. These pigments have a refractive index of about 1.4–1.6.

Typical ultraviolet light stabilizers which are useful in this invention are as follows:

Benzophenones such as hydroxydodecyloxybenzophenone, 2,4-dihydroxybenzophenone, hydroxybenzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic monoesters of 2,2',4-trihydroxy-4'-alkoxybenzophenone, 2-hydroxy-4-methoxy-2'-carboxybenzophenone;

Triazoles such as 2-phenyl-4-(2'-4'-dihydroxybenzoyl)triazoles, substituted benzotriazoles such as hydroxyphenyltriazoles such as 2-(2'-hydroxy-5'-methylphenyl)benzotriazole, 2-(2'-hydroxyphenyl)benzotriazole, 2-(2'-hydroxy-5'-octylphenyl)naphthotriazole;

Triazines such as 3,5-dialkyl-4-hydroxyphenyl derivatives of triazine, sulfur-containing derivatives of diallyl-4-hydroxyphenyltriazines, hydroxyphenyl-1,3,5-triazines and such triazines containing sulfonic acid groups, aryl-1,3,5-triazines, orthohydroxyaryl-s-triazine;

Benzoates such as dibenzoate of diphenylolpropane, t-butyl benzoate of diphenylolpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl)benzene, metal derivatives of 3,5,-di-t-butyl-4-hydroxyphenylpropionic acid, asymmetrical oxalic acid diarylamides, alkylhydroxyphenylthioalkanoic acid esters, dialkylhydroxyphenylalkanoic acid esters of di- and tri-pentaerythritol, phenyl- and naphthalene-substituted oxalic acid diamides, methyl-$\beta$-(3,5-di-t-butyl-4-hydroxyphenyl)propionate, $\gamma,\gamma'$-bis(2-hydroxyphenyl)-diisopropylbenzene, 3,5'-dibromo-2'-hydroxyacetophenone, ester derivatives of 4,4-bis(4'-hydroxyphenyl)pentanoic acid wherein there is at least one unsubstituted position ortho to the aromatic hydroxyl groups, organophosphorus sulfides such as bis(diphenylphosphinothioyl)monosulfide and bis(diphenylphosphinothioyl)disulfide, 4-benzoyl-6-(dialkylhydroxybenzyl) resorcinol, bis(3-hydroxy-4-benzoylphenoxy)diphenylsilane, bis(3-hydroxy-4-benzoylphenoxy)dialkylsilane, 1,8-naphthalimides, $\gamma$-cyano-$\beta,\beta$-diphenylacrylic acid derivatives, bis(2-benzoxazolyl)alkanes, bis(2-naphthoxazolyl)alkanes, methylene malonitriles containing aryl and heterocyclic substitutes, alkylenebis(dithio)carbamate, 4-benzoyl-3-hydroxyphenoxyethyl acrylate, 4-benzoyl-3-hydroxyphenoxyethyl methacrylate, aryl- or alkyl-substituted acrylonitriles, 3-methyl-5-isopropylphenyl-6-hydroxycoumarone.

Particularly useful ultraviolet light stabilizers that can be used are hindered amines of bipiperidyl derivatives such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoylpyrazolate (5)]-Ni, bis[-phenyldithiocarbamato]-Ni(II), and others listed in the above patent, column 8, line B 44 through line 55.

Typical antioxidants are as follows: tetrakisalkylene dialkylhydroxyaryl alkyl ester alkanes such as tetrakismethylene-3-(3',5'-dibutyl-4'-hydroxyphenyl) propionate methane, the reaction product of p-aminodiphenylamine and glycidyl methacrylate, the reaction product of n-hexyl-N'-phenyl-p-phenylene diamine and glycidyl methacrylate, pentaerythritol tetrakis(thioglycolate), trimethylolpropane tris(thioglycolate), trimethylolethane tris(thioglycolate), N-(4-anilinophenyl)acrylamide, N-(4-anilinophenyl)maleamic acid, N-(4-anilinophenyl)maleimide, alkylhydroxyphenyl groups bonded through carboalkoxy linkages to the nitrogen atom of a heterocyclic nucleus containing an imidocarbonyl group or an imidothiocarbonyl group, 3,5-di-t-butyl-4-hydroxycinnamonitrile, ethyl-3,5-di-t-hexyl-4-hydroxycinnamate, substituted benzyl esters of $\beta$-substituted hydroxyphenylpropionic acids, bis(hydroxyphenylalkylene) alkyl isocyanurate compounds, tetrakishydroxybenzylphosphonium halides alone or in combination with a dialkyl-thiodialkanoate, thiodimethylidyne tetrakisphenols alone or in combination with a dialkyl thiodialkanoate or phosphite or phosphonate, dihydrocarbylhydroxyphenylaryl or -alkyl phosphonites or phosphonates or phosphates or phosphites or phosphinates or phosphinites or phosphorothionates or phosphinothionates, diphenylbis(3,5-di-t-butyl-4-hydroxyphenoxy)silane, hydrocarbylhydroxyphenyl-dihydrocarbyldithiocarbamates such as 3,5-di-t-butyl-4-hydroxyphenyldimethyldithiocarbamate and aminobenzylthioether.

One preferred combination of ultraviolet stabilizer and antioxidant is 2-(3',5'-di-tertamyl-2'-hydroxyphenyl) benzotriazole and Ni bis[o-ethyl (3,5-ditert-butyl-4-hydroxybenzyl) phosphonate].

The following Examples illustrate the invention. All parts and percentages are on a weight basis unless otherwise indicated. Molecular weights are determined by gel permeation chromatography using polymethyl methacrylate as a standard.

EXAMPLE 1

A Polymer Solution 1 is prepared by charging the following constituents into a polymerization vessel equipment with a reflux condenser and a heating mantel.

|  | Parts By Weight |
|---|---|
| Portion 1 |  |
| Methyl amyl ketone | 1306.0 |
| Portion 2 |  |
| Styrene monomer | 315.0 |
| Methyl methacrylate monomer | 311.0 |
| N—butyl acrylate monomer | 823.0 |
| 2-Hydroxy ethyl acrylate monomer | 630.0 |
| 2-Perfluoro alkyl ethyl methacrylate monomer (alkyl group containing 32%, C-6, 30% C-8, 18% C-10, 12% C-12 and 8% higher carbon atoms) | 16.8 |
| Acrylic acid monomer | 4.2 |
| Portion 3 |  |
| Methyl amyl ketone | 140.0 |
| T-butyl per acetate solution (75% solids in mineral spirits) | 69.4 |
| Total | 3615.4 |

Portion 1 is charged into the polymerization vessel and heated to its reflux temperature. Portions 2 and 3 are added simultaneously at a uniform rate over a 240 minute period while holding the resulting reaction mixture at its reflux temperature. The reaction mixture is held at its reflux temperature for an additional 30 minutes and then 722 parts of methyl amyl ketone are stripped off.

The resulting Polymer Solution I has a polymer solids content of about 74%, a Gardner Holdt viscosity measured at 25° C. of Z+½ and a relative viscosity measured at 25° C. of 1.03. The polymer has an acid number of 3.5, a weight average molecular weight of about 6000 and the following composition: 15% styrene, 14.8% methyl methacrylate, 39.2% n-butyl acrylate, 30% 2-hydroxyethyl acrylate, 0.2% acrylic acid and 0.8% 2-perfluoro alkyl ethyl methacrylate.

A Polymer Solution II is prepared using the identical constituents and polymerization procedure as used above except the perfluoro alkyl ethyl methacrylate is omitted and the n-butyl acrylate content is increased 0.8%. The resulting polymer solution has the same polymer solids content, Gardner Holdt viscosity as above and the polymer has the same acid number and weight average molecular weight. The polymer has the following composition: 15% styrene, 14.8% methyl methacrylate, 40% n-butyl acrylate, 30% 2-hydroxy ethyl acrylate and 0.2% acrylic acid.

The following paints are formulated by thoroughly blending together the following constituents:

| Paint A | Parts By Weight |
|---|---|
| Polymer Solution I (prepared above) | 363 |
| Acrylic Polymer Solution (58% solids of a polymer of styrene/methyl methacrylate/n-butyl acrylate/2-hydroxyethyl acrylate/ acrylic acid in a weight ratio of 29/21/32/17/1 having an acid number of 8, a Gardner Holdt viscosity at 25° C. of X + ¼ and a relative viscosity at 25° C. of 1.0619 in a mixture of organic solvents) | 45 |
| Fully Methylated/Butylated Melamine Formaldehyde Resin (ratio of methyl groups to butyl groups is 1:1) | 186 |
| Ultraviolet Light Stabilizer Solution [11 parts 2-(3,5'-di-tert amyl-2'-hydroxyphenyl)benzotriazole and 47 parts butyl carbitol] | 58 |
| Antioxidant Solution (5 parts Ni bis[0-ethyl (3,5-ditert-butyl-4-hydroxy benzyl)phosphonate] and 21 parts methanol) | 26 |
| Green Mill Base (Dispersion of 34% acrylic polymer of 50% styrene/38% butyl acrylate/8% 2-hydroxy ethyl acrylate/4% acrylic acid, 10% "Monastral" Green Pigment, 49% butyl acetate and 7% aromatic controlled VM + P Naphtha) | 121 |
| Diethylene glycol monobutyl ether | 25 |
| Acid catalyst solution (17.8% paratoluene sulfonic acid, 9.8% dimethyl oxazolidine in 72.4% methanol) | 9.5 |
| Dimethyloxazolidine Solution (20% in methanol) | 9.5 |
| Total | 843 |

Paint B is prepared using the identical constituents except Polymer Solution II is substituted for Polymer Solution I. Both of the paints are reduced to 51 second Fisher cup viscosity with xylene. A set of six steel panels primed with a conventional alkyd resin primer coating are spray coated with Paint A and baked for 30 minutes at 122° C. A second set of six steel panel primed as above are spray coated with Paint B and baked under the same conditions.

The panels have the following properties:

|  | Paint A | Paint B |
|---|---|---|
| Dry Film Thickness | 2.0–2.3 mils | 1.5–1.7 mils |
| Gloss (measured at 20°) | 88 | 86 |
| Hardness | 3.4 knoops | 4.1 knoops |
| Recoat Adhesion | Acceptable | Acceptable |
| Cratering (total number of craters on six panels) | 13 | 94 |

Gloss, hardness and recoat adhesion (which measure adhesion of a second coat of paint) were about equal for paints A and B. However, Paint A made with polymer solution in which the polymer contained 2-perfluoro alkyl ethyl methacrylate monomer has substantially fewer craters than Paint B which did not use this monomer.

I claim:

1. A coating composition comprising about 25–80% by weight of a binder and 20–75% by weight of an organic liquid; wherein the binder comprises
   (A) about 40–90% by weight, based on the weight of the binder, of an acrylic polymer having a hydroxyl content about 0.5 to 10% by weight, and consists essentially of an alkyl methacrylate having 1–18 carbon atoms in the alkyl group, an alkyl acrylate having 2–18 carbon atoms in the alkyl group, a hydroxyalkyl acrylate or a hydroxy alkyl methacrylate having 2–4 carbon atoms in the alkyl group up to 5% by weight of an α-β ethylenically unsaturated acid, and contains about 0.5-5% by weight based on the weight of the acrylic polymer, of polymerized perfluorocarbon constituent of the formula

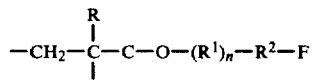

where
R is H or CH$_3$,
R$^1$ is an alkyl group containing 2-8 carbon atoms, n is 0 or 1 and
R$^2$ is a perfluoroalkyl group containing 4-20 carbon atoms and the polymer has a weight average molecular weight of about 2000-50,000 determined by gel permeation chromatography; and
(B) about 10-60% by weight, based on the weight of the binder, of an alkylated melamine formaldehyde resin.

2. The coating composition of claim 1 containing pigment in a pigment to binder weight ratio of about 0.5 to 100 to about 300 to 100.

3. The coating composition of claims 1 or 2 comprising about 55-75% by weight, of the binder and 25-45% by weight of an organic solvent for the binder.

4. The coating composition of claim 1 in which the acrylic polymer contains up to 50% by weight, based on the weight of the polymer, of styrene.

5. The coating composition of claim 1 in which the alkylated melamine formaldehyde resin has 1-4 carbon atoms in the alkyl group.

6. The coating composition of claim 3 in which
(A) the acrylic polymer consists essentially of polymerized monomers of about
    10-40% by weight of an alkyl methacrylate having 1-4 carbon atoms in the alkyl group,
    30-50% by weight of an alkyl acrylate having 2-12 carbon atoms in the alkyl group,
    15-45% by weight of a hydroxy alkyl acrylate or a hydroxy alkyl methacrylate each having 2-4 carbon atoms in the alkyl group
    0.1-5% by weight of acrylic acid or methacrylic acid and
    0.1-10% by weight of a perfluoro alkyl ethyl methacrylate having 6-12 carbon atoms in the alkyl group and
(B) the alkylated melamine formaldehyde resin has 1-4 carbon atoms in the alkyl group.

7. The coating composition of claim 4 in which
(A) the acrylic polymer consists essentially of about
    10-20% by weight of styrene,
    10-20% by weight of methyl methacrylate,
    35-45% by weight of butyl acrylate
    25-35% by weight of hydroxy ethyl acrylate,
    0.1-2% by weight of acrylic acid and
    0.5-5% by weight of a perfluoro alkyl ethyl methacrylate having 6-12 carbon atoms in the alkyl group and
(B) the alkylated melamine formaldehyde resin crosslinking resin is methylated and butylated melamine formaldehyde resin.

8. The coating composition of claim 7 in which the composition contains 0.1-5% by weight, based on the weight of the composition, of an acid catalyst.

9. The coating composition of claim 8 in which the acid catalyst is paratoluene sulfonic acid.

10. The coating composition of claim 1 or 2 containing about 0.1-5% by weight, based on the weight of the binder, of an ultraviolet light stabilizer.

11. The coating composition of claim 10 containing about 0.1-5% by weight, based on the weight of the binder of an antioxidant.

* * * * *